UNITED STATES PATENT OFFICE.

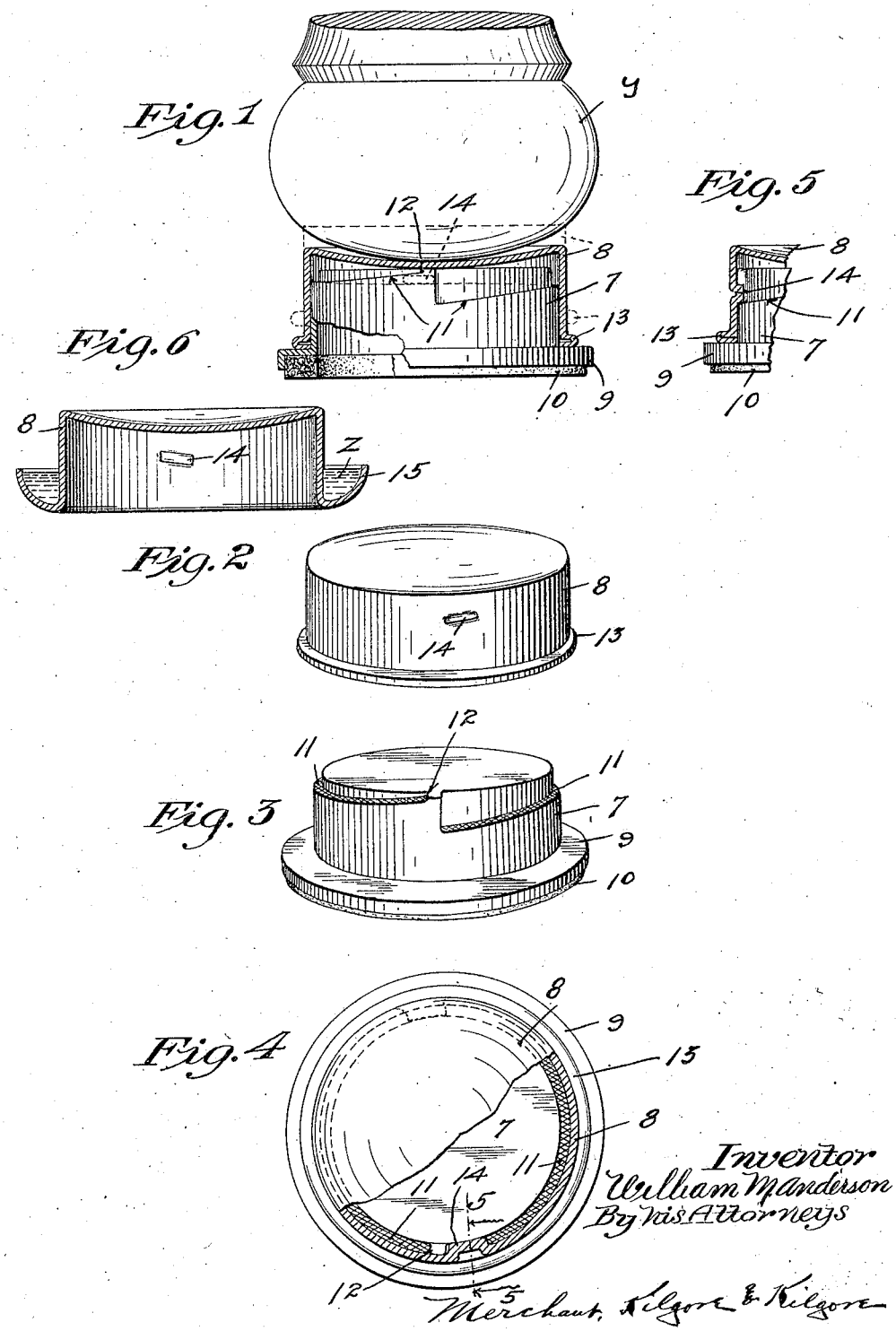

WILLIAM M. ANDERSON, OF MINNEAPOLIS, MINNESOTA.

CASTER CUP.

1,402,998. Specification of Letters Patent. Patented Jan. 10, 1922.

Application filed December 11, 1920. Serial No. 429,882.

*To all whom it may concern:*

Be it known that I, WILLIAM M. ANDERSON, a citizen of the United States, residing at Minneapolis, in the county of Hennepin and State of Minnesota, have invented certain new and useful Improvements in Caster Cups; and I do hereby declare the following to be a full, clear, and exact description of the invention, such as will enable others skilled in the art to which it appertains to make and use the same.

My present invention relates to caster cups and, more particularly, to such cups that may be vertically adjusted, whereby the top of a piece of furniture may be supported in a level position, irrespective of the condition of the underlying floor. The object of the invention is to provide a caster cup that can be very easily adjusted to vary the height thereof, and at the same time, to simplify the construction thereof so that it may be easily manufactured at a comparatively small cost.

To the above ends, generally stated, the invention consists of the novel devices and combination of devices hereinafter described and defined in the claims.

In the accompanying drawings which illustrate the invention, like characters indicate like parts throughout the several views.

Referring to the drawings:—

Fig. 1 is a fragmentary view of the invention, partly in elevation and partly in vertical section, having supported thereon, the leg of a piece of furniture;

Fig. 2 is a perspective view of the cap of the caster cup;

Fig. 3 is a perspective view of the base member of the caster cup;

Fig. 4 is a plan view of the caster cup with some parts broken away in section;

Fig. 5 is a fragmentary detail view with some parts sectioned on the line 5—5 of Fig. 4; and Fig. 6 is a view in central vertical section showing a modified form of cap.

The improved caster cup comprises an annular base member 7 in the form of an inverted cup and an annular cap 8 telescoped onto said member for rotation in respect thereto. On the lower edge of the base member 7 is a retaining flange 9 that extends horizontally outward and downward to receive and hold a felt cushion 10 that extends therebelow. The base member 7 and its flange 9 are pressed from a single piece of sheet metal and, pressed into the outer wall of said base member 7, is a peripheral bearing surface 11, at the upper end of which is a stop 12.

The cap 8 is also pressed from a single piece of sheet metal and the lower edge thereof is folded horizontally outward and then upon itself to afford a flange 13, which, when the cap 8 is completely telescoped onto the base member 7, rests on the flange 9. The top of the cap 8 is dished or made concave to receive and hold the leg Y of a piece of furniture or in case the leg supported on the caster cup is provided with a caster, said caster will rest directly in the concave top of the cap 8. Pressed inward from the wall of the cap 8 is a supporting lug 14, which loosely rests on the spiral bearing surface 11, as best shown in Fig. 5. When the cap 8 is completely telescoped onto the base member 7 with its flange 13 resting on the flange 9, the supporting lug 14 is at the lowermost end of the bearing surface 11.

Obviously, by rotating the cap 8 on the base member 7, its supporting lug 14 may be caused to travel upward on the bearing surface 11 and thereby raise the cap 8 on the base member 7 to vertically adjust the caster cup. When a set of the improved caster cups is placed under the legs of a piece of furniture, the cups 8 may be very easily adjusted to support said piece of furniture so that the top thereof is level, irrespective of the condition of the underlying floor. The purpose of the felt cushion 10 is to prevent the caster cup from scratching the floor.

Referring now to the cap shown in Fig. 6, the same is provided, at its lower edge, with an endless outstanding and upwardly curved flange 15 adapted to hold a liquid Z. The purpose of this liquid is to prevent bugs or insects from crawling up the legs of furniture and is especially adapted for use in the warm countries where such pests are prevalent.

The above described caster cup, while extremely simple and of comparatively small cost to manufacture, is thought to be highly efficient for the purpose had in view. As the supporting lugs 14 loosely rest on the bearing surface 11, the cap 8 may be very easily adjusted by rotating the same as there is no chance of the supporting lug binding or sticking, in respect to the bearing surface 11, and the pitch of said bearing surface is such that the supporting lug 14 will always stay where placed and not slip.

What I claim is:—

1. A caster cup comprising a base member having a spiral peripheral bearing surface, and a cap telescoped onto the base member and having a supporting lug resting on said bearing surface.

2. A caster cup comprising a base member having a spiral peripheral bearing surface telescopically and rotatably mounted on the base member and having a supporting lug resting on said bearing surface.

3. A caster cup comprising a base member having an outturned retaining flange, a cushion member held by said flange, said base member also having a spiral peripheral bearing surface, and a cap telescoped onto the base member and having a supporting lug resting on said bearing surface.

4. A caster cup comprising a base member having on its lower edge an outturned flange and also having a spiral peripheral bearing surface, and a cap telescoped onto the base member and having a supporting lug resting on said bearing surface, said cap also having at its lower edge a flange arranged to rest upon the flange of the base member.

5. A caster cup comprising a base member having a spiral peripheral bearing surface and a cap the top of which is concave, said cap having a supporting lug resting on said bearing surface.

6. A caster cup comprising a base member having a spiral peripheral bearing surface, and a cap telescopically and rotatably mounted on the base member and having a supporting lug resting on said bearing surface, and a stop for limiting the upward travel of the supporting lug on said bearing surface.

7. A caster cup comprising a base member formed from a single sheet of metal and having pressed therein a spiral peripheral bearing surface, and a cap telescopically and rotatably mounted on the base member and having a supporting lug resting on said bearing surface.

8. A caster cup comprising a base member having a spiral peripheral bearing surface, and a cap telescopically and rotatably mounted on the base member, said cap being formed from a single sheet of metal and having pressed therefrom a supporting lug resting on the bearing surface.

9. A caster cup comprising a base member, and a cap vertically adjustable on the base member, said cap being provided with an endless peripheral liquid holding flange.

In testimony whereof I affix my signature.

WILLIAM M. ANDERSON.